United States Patent [19]
Watson et al.

[11] 4,001,030
[45] Jan. 4, 1977

[54] TREATMENT OF WASTE PRODUCTS FROM PORTLAND CEMENT MANUFACTURE

[75] Inventors: David Watson, New Barn, near Dartford; Arthur William Brown, London, both of England

[73] Assignee: The Associated Portland Cement Manufacturers Limited, London, England

[22] Filed: Feb. 18, 1975

[21] Appl. No.: 550,569

[30] Foreign Application Priority Data

Feb. 28, 1974 United Kingdom ............... 9093/74
Mar. 8, 1974 United Kingdom ............ 10536/74

[52] U.S. Cl. .............................. 106/100; 106/103
[51] Int. Cl.² .......................................... C04B 7/06
[58] Field of Search ................... 106/100, 102, 103

[56] References Cited
UNITED STATES PATENTS 1,219,315  3/1917  Huber et al. ...................... 106/100
2,687,290  8/1954  Garoutte ........................... 106/100

*Primary Examiner*—J. Poer
*Attorney, Agent, or Firm*—Baldwin, Wight & Brown

[57] ABSTRACT

A process of treating kiln flue dust from Portland cement manufacture which comprises calcining said flue dust together with a minor proportion by weight of a fluoride salt.

7 Claims, No Drawings

TREATMENT OF WASTE PRODUCTS FROM PORTLAND CEMENT MANUFACTURE

The present invention relates to the treatment of waste products from Portland cement manufacture, more particularly to render them suitable for recycling.

In the manufacture of Portland cement, the raw materials, comprising primarily limestone or chalk, the main chemical constituent of which is calcium carbonate, and clay or shale, the main chemical constituents of which are aluminosilicates, are finely ground, blended together, and fed to a rotary kiln. Heat is supplied to the rotary kiln with an oil, gas, or pulverised coal flame; the heat from this fuel flame causes firstly, any water associated with the raw material feed to be evaporated off, secondly, the calcium carbonate constituent of the feed to be thermally decomposed yielding calcium oxide (solid) and gaseous carbon dioxide, and finally, at a temperature of about 1350° C., the completion of the chemical reactions between the calcium oxide and the aluminosilicates and other constituents of the kiln feed materials yield cement clinker which comprises mainly tricalcium silicate and dicalcium silicate together with liquid phases which are mainly calcium aluminates and calcium aluminoferrites.

Most of the raw materials fed to the kiln become reacted together in this way but a proportion of them becomes entrained as dust in the gas stream passing through the kiln. The gases comprise combustion products from the fuel flame, carbon dioxide resulting from thermal decomposition of the calcium carbonate constituent and water vapour evaporated off from the incoming raw material feed. The gases leaving the kiln, being dust-laden in this way, are passed through cleaning equipment to remove the dust before the gases are emitted to the atmosphere.

The solid dust collected in this gas cleaning equipment is primarily dry, powdered raw materials, i.e., limestone and clays, together with some calcium oxide, a little cement clinker dust, and often an appreciable proportion of alkali metal salts, mainly sodium chloride, potassium chloride, sodium sulphate and potassium sulphate. These alkali metal salts derived from the soda, potash, chloride and sulphur or sulphate contents of the kiln feed material and the kiln fuel; being relatively volatile they volatilise off from the kiln feed materials in the hottest (approximately 1350° C.) part of the kiln, become incorporated as vapours into the gases passing through the kiln, and as those gases become cooled in their passage through the kiln they condense and become incorporated with the solid dust particles entrained in the kiln gas stream. The proportion of these alkali metal salts in the kiln dust varies widely depending on various factors, primarily the potash, soda, chloride and sulphur or sulphate contents of the kiln raw material feed and kiln fuel, and also on the extent of solid dust loss from the kiln. For instance, the potash content of kiln dust expressed as potassium oxide ($K_2O$) may be less than 1 percent or may be in excess of 40 percent by weight of the dust.

The total quantity of dust emitted from the kiln and collected in the gas cleaning equipment may be as low as 3 tons dust per 100 tons cement clinker produced from the kiln, or it may be as much as 20 tons dust per 100 tons cement clinker, depending on the nature of the kiln feed raw materials and the kiln operating conditions.

It will be seen that cement kilns producing, say, one million tons per annum of cement clinker may well produce 100,000 tons per annum of kiln dust collected in the gas cleaning equipment and the question arises as to what to do with this quantity of dust.

Where the alkali metal salt content and sulphate content of the dust are low, it will usually be best to return the dust to the kiln either separately or by mixing it into the kiln feed material so that it may become fully processed and incorporated with the cement clinker product. However, where the alkali salt content or sulphate content of the dust is high, such return is often not possible because it would cause a larger recirculating load of alkali metal salts in the kiln which may alter the composition of the clinker product to the detriment of its quality, or may cause a build-up of alkali metal salt and sulphate bound deposits in the kiln which interfere with its steady operation, or may cause such a high concentration of alkali metal salts in the kiln dust that the proper operation of the gas cleaning equipment is adversely affected.

The kiln dust has often simply been dumped but, besides the frequent difficulty of finding suitable areas for such disposal and the waste of raw materials which such dumping represents, where the alkali metal salt content of the dust is high these salts, being water soluble, may become leached out with rainwater and cause pollution of the local groundwaters.

The potash content of the kiln dust raises interest in the possibility of its use as a fertiliser, but the relatively low and variable content of potash usually inhibits fertiliser manufacturers and distributors from the use of kiln dust for this purpose.

Another possibility is to process the kiln dust by forming it into small pellets of a suitable size distribution and calcining then in a fluidised bed at a suitable temperature, often between 1000° and 1200° C. The objective here is twofold: firstly so to reduce the alkali metal salt content of the dust and to cause sufficient combination of the calcium carbonate and aluminosilicate constituents that the calcined dust may then be re-introduced into the cement making process without prejudicing either the continuity of the cement making process or the quality of the cement product, and, secondly, to collect the alkali metal salt vapours volatilised off from the fluidised bed calciner in a concentrated form which may then be economically used as, or incorporated into, fertilisers. To be successful such a fluidised bed calciner must be run at an operating temperature not exceeding about 1200° C., because above 1200° C. the content of liquid calcium aluminate and calcium aluminoferrite phases becomes so high that the material being calcined in the fluidised bed becomes sticky and will adhere to itself and to the walls of the fluidised bed, threby causing the fluidised bed to become inoperable.

Because of this limitation of about 1200° C on the maximum feasible fluidised bed operating temperature in order to avoid pellet agglomeration and problems of sticking in the bed, the reactions between the calcium oxide and aluminosilicate constituents of the material being processed do not normally proceed to anywhere near completion. The result is that the content of free, unreacted lime (CaO) in the calcined product is normally rather high, for instance around 15 percent; this means that the permissible addition rate of the product calcined in the fluidised bed, into the cement clinker grinding stage of the normal cement making process, is limited because too much free lime in the final cement product may cause unsoundness of concrete made from that cement. Furthermore the fact that an appreciable amount of the calcium oxide and aluminosilicate in the fluidised bed calcined product remains unreacted, means that these unreacted components act as a diluent to the finished cement and may therefore reduce the strength characteristics of the cement.

It is an object of the present invention to provide a mineralizer or catalyst to encourage the more complete reaction of the calcium oxide and aluminosilicate contents of flue dust calcined in the fluidised bed without the necessity to exceed the temperature of about 1200° C above which too much liquid phase and stickiness could develop in the fluidised bed.

It is another object of the invention to enable the major part of the alkali metal salts in flue dust to be volatilised in the fluidised bed calciner at a temperature not above 1200° C.

In normal cement making practice one often uses additions of iron oxide, or sometimes alumina or magnesia, to reduce the temperature required for chemical combination, but such additives are effective because they increase the quantity of liquid melt phases at relatively low temperatures, and it will be obvious that their use in a fluidised bed for this purpose is not acceptable because the bed operating temperature would have to be reduced yet further to avoid stickiness and agglomeration.

According to the present invention we incorporate into flue dust fed to a calciner, a minor proportion by weight of a fluoride salt. The flue dust is preferably pelletised and the calciner is preferably a fluidised bed calciner. Such an addition promotes the reactions between the calcium oxide and aluminosilicate contents of the material being calcined, enabling those reactions to proceed to a greater degree of completion at the maximum permissible temperature of about 1200° C and enabling the free lime (CaO) content of the calcined product to be substantially lowered.

Because the presence of a fluoride salt in an effective proportion does not materially increase the total liquid phase content at the calciner operating temperature, it will not in any way contribute to problems of pellet agglomeration or sticking to the sides of a fluidised bed calciner. The most effective addition rate of the fluoride, to lower the combination temperature without producing undesirable side effects depends on the composition of the particular flue dust: typically the required addition rate will lie from 0.05 to 0.5 Kg fluoride ion (F) per 100 Kg of flue dust, but amounts up to 2.0 Kg percent fluoride ion may be found useful. The source of fluoride ion will be that most readily available at an economic price. Preferably this will be calcium fluoride or fluorspar, blended as a finely ground powder into the dry cement kiln flue dust before the latter is pelletised and fed to the calciner.

As already indicated, at least the major part of the alkali metal salts in the flue dust should be volatilised at the calciner operating temperature, which should not exceed about 1200° C.

Because potassium chloride, and, to a rather less extent, sodium chloride, may be substantially volatilised at 1200° C., whereas potassium sulphate and sodium sulphate remain substantially undecomposed and unvolatilised at that temperature, the successful operation of a fluidised bed calciner for kiln dust calcination is much dependent on the relative choride and sulphate contents of the kiln dust.

According to a preferred feature of the present invention we add calcium chloride to the kiln dust feed to the calciner, preferably a fluidised bed calciner, so as to enable the major proportion of the alkali metal salts to be volatilised off at a temperature not exceeding about 1200° C.

The theoretical quantity of calcium chloride it is necessary to add to convert all the alkali metal salts to volatile chlorides may be calculated from the chemical composition of the kiln dust. In practice we use at least 75 percent by weight of that quantity.

The calculation is illustrated by the following Example.

In the processing of 1000 kg/h of kiln dust which contains:

|  | percent w/w |
| --- | --- |
| potassium expressed as $K_2O$ | 8.0 |
| sodium expressed as $Na_2O$ | 0.8 |
| chloride expressed as Cl | 2.7 |
| sulphate expressed as $SO_3$ | 5.2 | the mass flow rates of these constituents of the kiln dust will be:

|  | kg/h |
| --- | --- |
| $K_2O$ | 80 |
| $Na_2O$ | 8 |
| Cl | 27 |
| $SO_3$ | 52 |

From consideration of the molecular and atomic weights of the various constituents it is known that:
1 kg of $K_2O$ requires 0.75 kg of Cl for complete conversion to KCl (potassium chloride)
1 kg of $Na_2O$ requires 1.13 kg of Cl for complete conversion to NaCl (sodium chloride)
1 kg of $K_2O$ requires 0.85 kg of $SO_3$ for complete conversion to $K_2SO_4$ (potassium sulphate)
1 kg of $Na_2O$ requires 1.29 kg of $SO_3$ for complete conversion of $Na_2SO_4$ (sodium sulphate)

Using the above data and assuming that, as KCl is more volatile than NaCl, the available chloride (C1) will be used to volatilise the potash in preference to the soda, then, in this example theoretically 36 kg/h of the incoming 80 kg/h of potash ($K_2O$) will be volatilised off as potassium chloride, whilst the remaining 44 kg/h of potash will be retained in the fluidised bed product as potassium sulphate ($K_2SO_4$) and also all the 8 kg/h of soda ($Na_2O$) will be retained in the fluidised bed product as sodium sulphate ($Na_2SO_4$): that is, theoretically less than a half of the potash and none of the soda will be volatilised off from the fluidised bed at 1200° C.

Now, the calculated amount of chloride needed to enable all the potash to be converted to potassium chloride and thereby be volatilised off is 60 kg/h of chloride (C1) and the calculated amount of chloride to enable all the soda to be converted to sodium chloride and volatilised off is 9 kg/h of chloride (C1), therefore the total quantity of chloride required is 69 kg/h. The chloride derived from the incoming dust is only 27 kg/h, so it is necessary to supply an additional 42 kg/h of chloride (C1). Since calcium chloride ($CaCl_2$) contains 66 percent by weight of chloride (C1), it would be necessary in theory to add 64 kg/h of calcium chloride to the 1000 kg/h of kiln dust feed, in order to ensure substantially complete removal of the potash and soda in the fluidised bed calcination process at 1200° C. As stated, we find that an addition of 75 percent of this amount or more, is satisfactory in practice.

Calcium chloride is a substance which is readily available at an economic price, and it is highly soluble in water, so that it may conveniently be incorporated into the flue dust feed to a fluidised bed calciner by incorporating the required amount dissolved in the water which is used to pelletise the flue dust prior to feeding it to the fluid bed calciner.

The flue dust to be treated may be any flue dust from a Portland cement manufacturing process, and the calcined treated flue dust may be recycled or re-used in the same or any similar process, subject to any local qualifications regarding the admixture of raw materials.

In principle the calciner may be of any type, but a fluidised bed calciner is preferred; such calciners are well known in themselves, consisting generally of a container shaft with the usual fluidising gas inlet grate at the bottom. The calciner is most preferably of a type affording removal of reacted solids from the bottom part of the bed, the volatile products being taken off overhead.

The fluoride salt to be added to the flue dust has substantially no effect on the composition of clinker incorporating the recycled product, the amount of the salt being insignificant especially when it is a calcium salt. The calcium chloride added in the preferred practice of the invention is likewise inoccuous in the eventual clinker since it introduces merely calcium and eventually volatile matter. If too much chloride were introduced, some would remain and find its way into the clinker when recycled, whereas the use of too little chloride would incur the risk of some undesired potassium compounds remaining in the clinker. An amount of 75 to 100 weight per cent of the theoretical is found beneficial.

The following Examples are given for the purpose of illustrating the invention without thereby limiting its scope. Examples 1 to 3 show the effects of calcium fluoride addition on a typical Portland cement kiln dust when calcined in a fluidised bed for a residence time of 20 minutes under the various temperature conditions stated, the percentages being by weight.

EXAMPLE 1

At 1200° C, with no calcium fluoride addition, calcination in the fluidised bed gives a product containing 14 percent free lime. When 1 percent calcium fluoride is added, the free lime is reduced to 4 percent When 2 percent calcium fluoride is added, the free lime is reduced to 1 percent.

EXAMPLE 2

At 1150° C, with no calcium fluoride addition, calcination in the fluidised bed gives a produce containing 15.3 percent free lime. When 1 percent calcium fluoride is added, the free lime is reduced to 6.8 percent. When 2 percent calcium fluoride is added, the free lime is reduced to 2 percent.

EXAMPLE 3

At 1100° C, with no calcium fluoride addition, calcination in the fluidised bed gives a product containing 15.8 percent free lime. When 1 percent calcium fluoride is added, the free lime is reduced to 10.4 percent. When 2 percent calcium fluoride is added, the free lime is reduced to 5 percent.

Examples 4 to 6 show the effects of calcium chloride addition on Portland cement kiln dust having the composition of 8.0 percent $K_2O$, 0.8 percent $Na_2O$, and 2.7 percent Cl when calcined in a fluidised bed for a residence time of 10 minutes under the various temperature conditions stated.

EXAMPLE 4

At 1200° C, with no calcium chloride addition, 48 percent of the potash and 29 percent of the soda were volatilised off in the fluidised bed. When the calculated amount of calcium chloride was incorporated with the kiln dust feed to the fluidised bed, 73 percent of the potash and 65 percent of the soda were volatilised off under the same conditions of time and temperature.

EXAMPLE 5

At 1150° C, with no calcium chloride addition, 37 percent of the potash and 24 percent of the soda were volatilised off in the fluidised bed. When the calculated amount of calcium chloride was incorporated with the kiln dust feed to the fluidised bed, 55 percent of the potash and 48 percent of the soda were volatilised off under the same conditions of time and temperature.

EXAMPLE 6

At 1100° C, with no calcium chloride addition, 28 percent of the potash and 18 percent of the soda were volatilised off in the fluidised bed. When the calculated amount of calcium chloride was incorporated with the kiln dust feed to the fluidised bed, 38 percent of the potash and 33 percent of the soda were volatilised off under the same conditions of time and temperature.

Whereas the effects of adding calcium fluoride and of adding calcium chloride are exemplified separately above for the sake of clarity, it will be appreciated that in the performance of the present invention the fluoride salt will in fact be present in all cases, and the calcium chloride will preferably also be present, to provide an effective process in which the reaction between the calcium oxide and the aluminosilicate is encouraged and the alkali metal compounds are removed.

What we claim is:

1. In a process of calcining a fluidized bed of flue dust arising from Portland cement manufacture to volatilize alkali metal salts therefrom while causing combination of the calcium carbonate and aluminosilicate constituents of the dust, which comprises the steps of (a) forming a fluidized bed of the flue dust; and (b) calcining the fluidized bed of step (a) at a temperature sufficient to calcine the dust but not more than about 1200° C so that the content of liquid calcium aluminate and calcium aluminoferrite phases are not so high as causes the fluidized bed to become inoperable, whereby there is limited reaction between calcium oxide and aluminosilicate contents of the flue dust; the improvement which comprises:
 c. carrying out step (b) in the presence of a minor amount of calcium fluoride sufficient significantly to increase said limited reaction between calcium oxide and aluminosilicate contents of the flue dust at said temperature; and d. recovering a product which is sufficiently low in free calcium oxide content as to allow the product to be re-introduced into a cement making process.

2. In a process as claimed in claim 1, wherein said calcium fluoride provides from about 0.05 Kg to about 2.0 Kg fluoride ion per 100 Kg flue dust.

3. In a process as claimed in claim 1, wherein said calcium fluoride provides from about 0.05 Kg to about 0.5 Kg fluoride ion per 100 Kg flue dust.

4. In a process as claimed in claim 1, wherein calcium chloride is added to the flue dust to be calcined, in an amount from about 75 to about 100 percent of the theoretical amount for combination with the total alkali metal present.

5. A process according to claim 4, wherein the treated flue dust is incorporated into cement clinker.

6. In the process as defined in claim 1 wherein said kiln dust is pelletized prior to step (a).

7. In the process as defined in claim 6 wherein said kiln dust is pelletized by the addition thereto of an aqueous solution of calcium chloride, the calcium chloride being added to the kiln dust in an amount of from about 75 to about 100% of the theoretical amount for combination with the total alkali metal present in said kiln dust, whereby to enable the major proportion of said alkali metal present to be volatilized off at the temperature of and during step (a).

* * * * *